United States Patent
Yun et al.

(10) Patent No.: US 10,445,019 B2
(45) Date of Patent: Oct. 15, 2019

(54) MEMORY SYSTEM AND OPERATING METHOD THEREOF

(71) Applicant: SK hynix Inc., Gyeonggi-do (KR)

(72) Inventors: Ho-Jung Yun, Seoul (KR); Dong-Yeob Chun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 169 days.

(21) Appl. No.: 15/602,273

(22) Filed: May 23, 2017

(65) Prior Publication Data
US 2018/0067696 A1   Mar. 8, 2018

(30) Foreign Application Priority Data

Sep. 2, 2016 (KR) .......................... 10-2016-0113077

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0616* (2013.01); *G06F 3/0625* (2013.01); *G06F 3/0673* (2013.01); *G06F 3/0679* (2013.01); *Y02D 10/154* (2018.01)

(58) Field of Classification Search
None
See application file for complete search history.

(56) References Cited

U.S. PATENT DOCUMENTS

| | | | | |
|---|---|---|---|---|
| 2009/0172213 A1* | 7/2009 | Jayachandran | ....... | G06F 3/0625 710/19 |
| 2015/0006794 A1* | 1/2015 | Kang | ................ | G06F 3/0613 711/103 |
| 2015/0286411 A1* | 10/2015 | Ichishima | ............... | G06F 3/068 711/156 |
| 2016/0005444 A1 | 1/2016 | Chun et al. | | |

FOREIGN PATENT DOCUMENTS

KR   1020160100170   8/2016

* cited by examiner

*Primary Examiner* — Jason W Blust
(74) *Attorney, Agent, or Firm* — IP & T Group LLP

(57) ABSTRACT

A memory system includes: a memory device comprising a plurality of memory dies in which command operations corresponding to a plurality of commands received from a host are performed; and a controller suitable for issuing RS (Read Status) commands to memory dies included in a first memory die group among the memory dies, issuing the RS commands to memory dies included in a second memory die group, checking whether the command operations are performed in the memory dies, through responses to the RS commands, and resetting an issue period of the RS commands in response to a change of the memory dies to which the RS commands are issued.

20 Claims, 11 Drawing Sheets

MEMORY SYSTEM AND OPERATING METHOD THEREOF

CROSS-REFERENCE TO RELATED APPLICATIONS

The present application claims priority of Korean Patent Application No. 10-2016-0113077, filed on Sep. 2, 2016, which is incorporated herein by reference in its entirety.

BACKGROUND

1. Field

Exemplary embodiments of the present invention relate to a memory system for processing data to and from a memory device, and an operating method thereof.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system capable of rapidly and stably processing data provided to a memory device included therein and maximizing use efficiency of the memory device with minimized complexity, reduced performance degradation, and an operating method thereof.

In an embodiment, a memory system may include: a memory device comprising a plurality of memory dies, each memory die being suitable for performing one or more corresponding command operations in response to a plurality of corresponding commands received from a host operatively coupled to the memory system; and a controller suitable for issuing read status (RS) commands to the memory dies included in a first memory die group defined among the memory dies, issuing RS commands to the memory dies included in a second memory die group defined among the memory dies, checking whether the command operations are completed in the memory dies of the first and second memory die groups through responses to the RS commands, and respectively resetting issue periods of the RS commands according to the completion of the command operations of the memory dies of the first and second memory die groups.

The controller may issue the RS commands to the memory dies of the first and second memory die groups at first and second periods, and the controller may preferentially issue the RS commands to the memory dies of the first memory die group according to a reception order of the commands.

The controller may issue the RS commands for a first memory die having a high priority among the memory dies included in the first memory die group, and the controller may issue the RS commands for a second memory die having a low priority among the memory dies included in the first memory die group after checking completion of the command operation of the first memory die.

The controller may issue the RS commands to the memory dies included in the second memory die group according to operation times of the command operations in the memory dies included in the second memory die group and the issue periods.

The controller may issue first RS commands for a first memory die having a first operation time and second RS commands for a second memory die having a second operation time, among the memory dies included in the second memory die group.

The controller may compare a first issue period of the first RS commands with the second operation time, and may compare a second issue period of the second RS commands with the first operation time, and the controller may reset the first and second issue periods, and then may issue the first and second RS commands according to a result of the comparison.

The controller may issue the second RS commands when the first issue period exceeds the second operation time, and the controller may issue the first RS commands when the second issue period exceeds the first operation time.

The controller may issue the RS commands for a third memory die having a greatest operation time among the memory dies included in the second memory die group whenever a predetermined number of the RS commands are issued to the memory dies other than the third memory die.

The controller may issue the RS commands at third and fourth periods when a current issue period of the RS command to be currently issued exceeds a predetermined maximum issue period or when an accumulative time length of total issue periods so far including the issue period of the RS command to be currently issued exceeds a predetermined maximum accumulative time length.

The first to fourth periods may be determined according to a reference clock of the memory system, the first and second periods may have periods that are increased by an amount of integer multiples of the reference clock, and the third and fourth periods may have periods that are maintained to or decreased by an amount of integer multiples of the reference clock.

The controller may include: a scheduler suitable for scheduling the RS commands for the respective memory dies; and an aging controller suitable for controlling the issue of the RS commands to the third memory die, and the scheduler may include: a register suitable for storing the reception order of the commands, the issue periods and the operation time; and a scheduling unit suitable for scheduling the RS commands according to the reception order of the commands, the issue periods and the operation times.

In an embodiment, an operating method of a memory system comprising a memory device having a plurality of memory dies, the operating method, may include: receiving a plurality of commands from a host for the memory dies, respectively; performing, by the respective memory dies, command operations in response to the commands; issuing read status (RS) commands to the memory dies included in a first memory die group; Issuing the RS commands to the memory dies included in a second memory die group; checking whether the command operations are completed in the memory dies through responses to the RS commands; and respectively resetting issue periods of the RS commands according to the completion of the command operations of the memory dies.

The issuing of the RS commands may include: preferentially issuing the RS commands to the memory dies included in the first memory die group according to a reception order of the commands at first and second periods; and issuing the RS commands to the memory dies included in the second memory die group according to operation times of the command operations in the memory dies included in the second memory die group and the issue periods at the first and second periods.

The issuing of the RS commands may include: issuing the RS commands for a first memory die having a high priority among the memory dies included in the first memory die group; checking whether the command operation of the first memory die is completed; and issuing the RS commands for a second memory die having a low priority among the memory dies included in the first memory die group after checking the completion of the command operation of the first memory die.

The issuing of the RS commands may include issuing first RS commands for a first memory die having a first operation time and second RS commands for a second memory die having a second operation time, among the memory dies included in the second memory die group.

The issuing of the RS commands may further include: comparing a first issue period of the first RS commands with the second operation time, and comparing a second issue period of the second RS commands with the first operation time; and resetting the first and second issue periods, and then issues the first and second RS commands according to a result of the comparing.

The issuing of the RS commands may further include: issuing the second RS commands when the first issue period exceeds the second operation time; and issuing the first RS commands when the second issue period exceeds the first operation time.

The issuing of the RS commands may further include issuing the RS commands for a third memory die having a greatest operation time among the memory dies included in the second memory die group whenever a predetermined number of the RS commands are issued to the memory dies other than the third memory die.

The issuing of the RS commands may further include issuing the RS commands at third and fourth periods when a current issue period of the RS command to be currently issued exceeds a predetermined maximum issue period or when an accumulative time length of total issue periods so far including the issue period of the RS command to be currently issued exceeds a predetermined maximum accumulative time length.

The first to fourth periods may be determined according to a reference clock of the memory system, the first and second periods may have periods that are increased by an amount of integer multiples of the reference clock, and the third and fourth periods may have periods that are maintained to or decreased by an amount of integer multiples of the reference clock.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
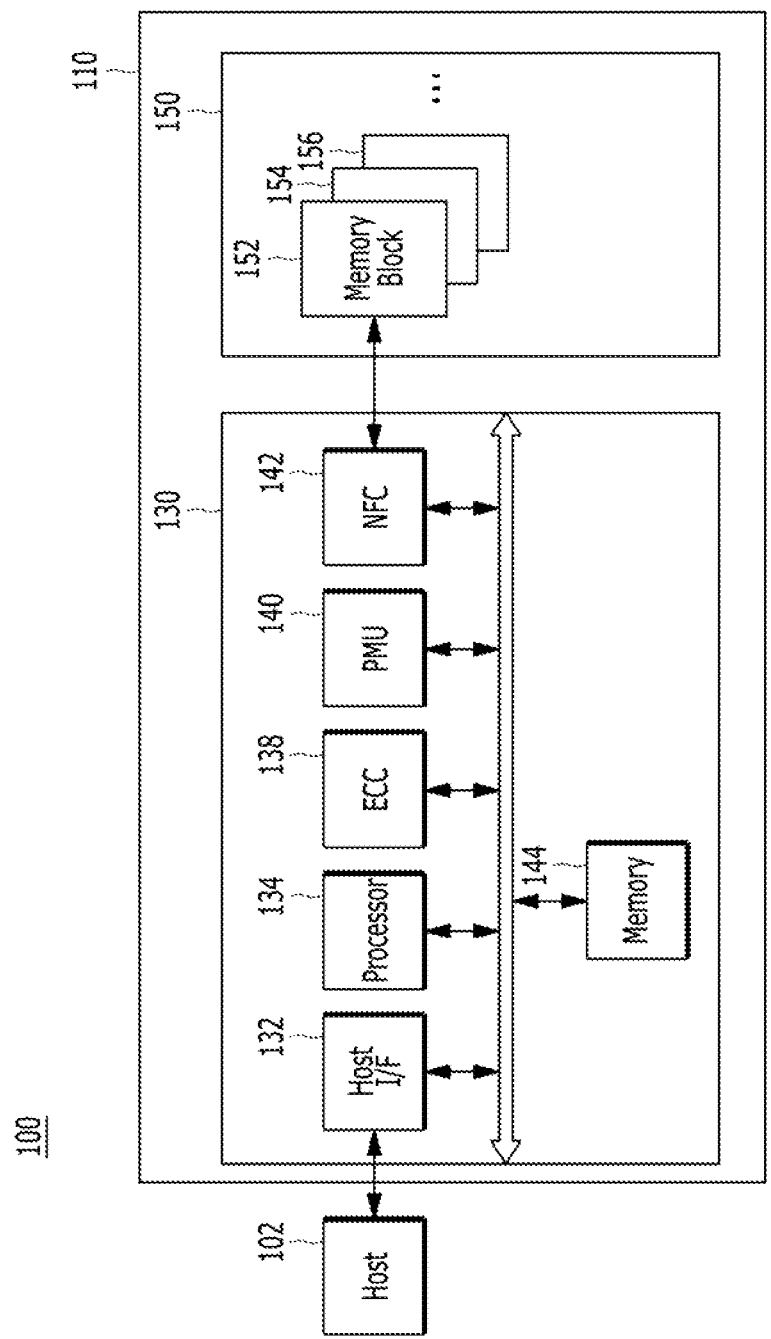
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "Includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a data processing system 100 including a memory system 100 in accordance with an embodiment of the present invention.

Referring to FIG. 1, the data processing system 100 may include a host 102 and the memory system 110.

The host 102 may include portable electronic devices such as a mobile phone, MP3 player and laptop computer or non-portable electronic devices such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request of the host 102. Non-limited examples of the memory system 110 may include solid state drive (SSD), multi-media card (MMC), secure digital (SD) card, universal storage bus (USB) device, universal flash storage (UFS) device, compact flash (CF) card, smart media card (SMC), personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as DRAM dynamic random access memory (DRAM) and static RAM (SRAM) and nonvolatile memory devices such as read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magneto-resistive RAM (MRAM), resistive RAM (RRAM) and flash memory. The flash memory may have a 3-dimensioanl (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies (not shown), each memory die including a plurality of planes (not shown), each plane including a plurality of memory blocks 152 to 156, each of the memory blocks 152 to 156 may include a plurality of pages, and each of the pages may include a plurality of memory cells coupled to a word line. In an embodiment, the memory device 150 may be embodied a flash memory. The flash memory may have a 3-dimensioanl (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and Integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
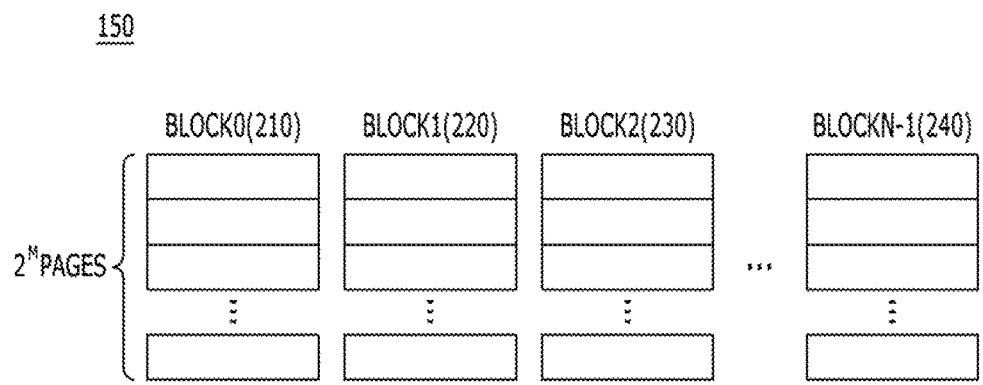
FIG. 2 is a schematic diagram illustrating an exemplary configuration of a memory device employed in the memory system of FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be of a single level cell (SLC) storing 1-bit data, and/or a multi-level cell (MLC) storing 2- or more bit data. Hence, the memory device 150 may include SLC memory blocks or MLC memory blocks, depending on the number of bits which can be expressed or stored in each of the memory cells in the memory blocks. An SLC memory block may include a plurality of pages which are embodied by memory cells each storing one-bit data, and may generally have high data computing performance and high durability. An MLC memory block may include a plurality of pages which are embodied by memory cells each storing multi-bit data (for example, 2 or more bits), and may generally have a larger data storage space than the SLC memory block, that is, higher integration density. In an embodiment, the memory device 150 may include a plurality of TLC (Triple Level Cell) memory blocks. In yet another embodiment, the memory device 150 may include a plurality of QLC (Quadruple Level Cell) memory blocks. The TCL memory block may include a plurality of pages which are embodied by memory cells each capable of storing 3-bit data, the QLC memory block may include a plurality of pages which are embodied by memory cells each capable of storing 4-bit data.

Figure 3:
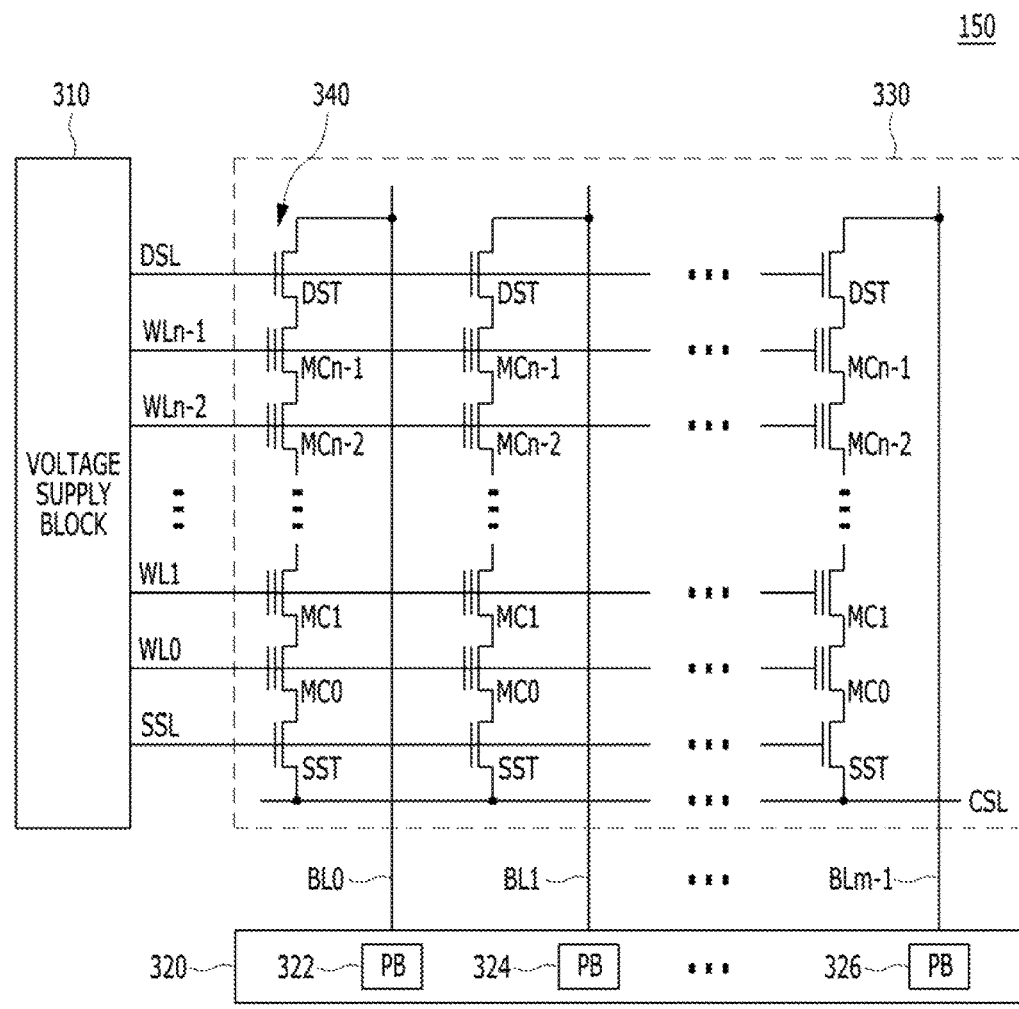
FIG. 3 is a circuit diagram illustrating an exemplary configuration of a memory cell array of a memory block in the memory device of FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
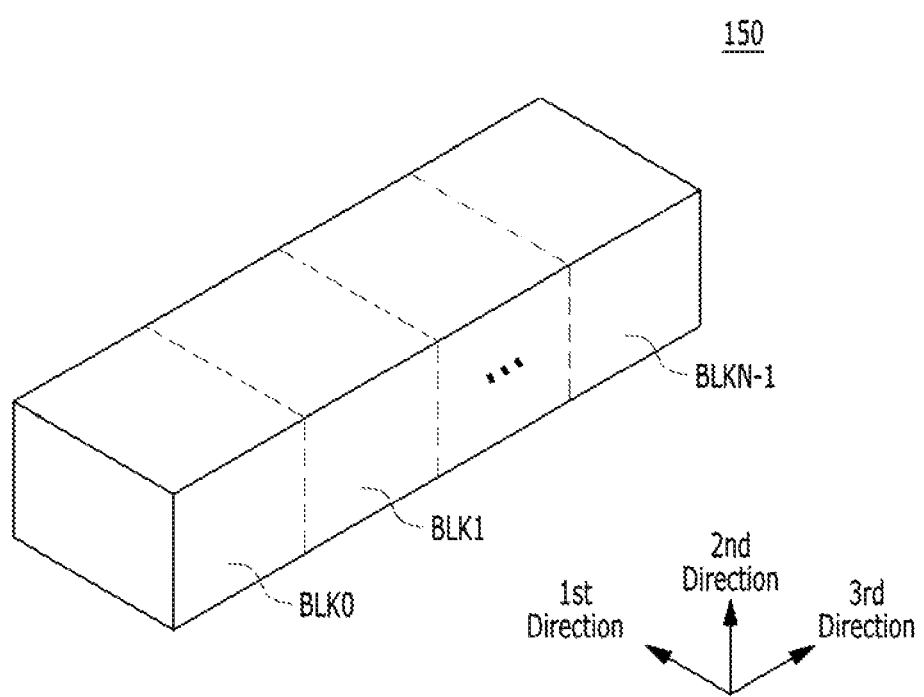
FIG. 4 is a schematic diagram illustrating an exemplary three-dimensional structure of the memory device of FIG. 2.

The memory device 150 may be embodied by a 2D or 3D memory device. FIG. 4 is a schematic diagram illustrating an exemplary 3D structure of the memory device 150.

Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each of the memory blocks having a 3D structure (or vertical structure).

Figure 5:
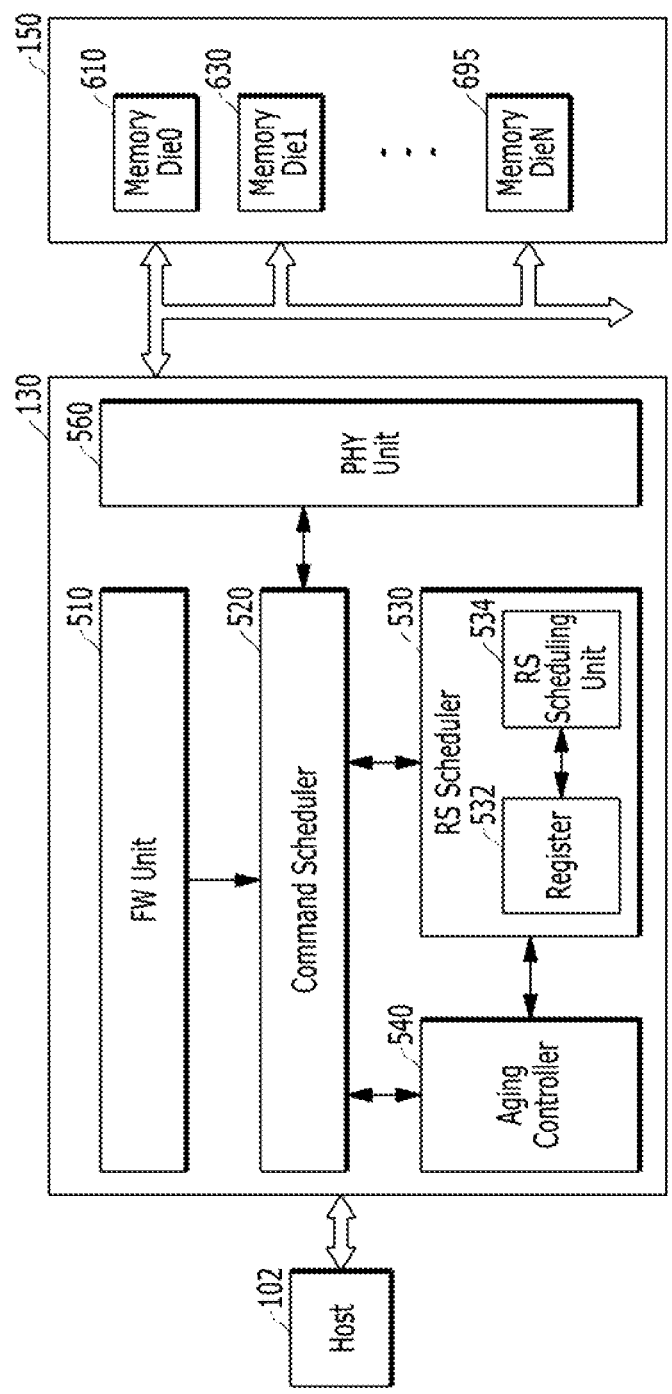
FIG. 5 is a block diagram illustrating a data processing system including a memory system in accordance with an embodiment of the present invention.

FIG. 5 is a block diagram illustrating a data processing system including a memory system in accordance with an embodiment of the present invention. The elements of FIG. 5 may be included in the data processing system 100 of FIG. 1.

Referring to FIG. 5, the memory device 150 may include a plurality of memory dies 610 to 695. The respective memory dies 610 to 695 may include the memory blocks 152 to 156 described with reference to FIGS. 1 to 4. The controller 130 may include a firmware unit 510, a command scheduler 520, a read status (RS) scheduler 530, an aging controller 540, and a physical layer (PHY) unit 560. The controller 130 may also one or more of the elements described with reference to FIG. 1. In response to requests from the host 102, the controller 130 may provide a plurality of commands (e.g., write, read, erase commands and so forth) to the memory device 150 in order for the memory device 150 to perform command operations (e.g., write or program, read, erase operations and so forth) in response to the provided commands.

The firmware unit 510 may generate commands to be provided to the memory device 150 in order for the memory device 150 to perform command operations in response to the provided commands. The commands may correspond to the requests provided from the host 102. The respective commands may be directed to one or more of the memory dies 610 to 695.

The command scheduler 520 may schedule the commands, which are generated by the firmware unit 510, according to a predetermined scheduling order. The command scheduler 520 may schedule the plurality of commands for the memory device 150, generated by the firmware unit 510, according to an ordering method of the commands for the memory device 150 or an ordering method of the command operations corresponding to the commands. In particular, the command scheduler 520 may schedule commands for the plurality of memory dies included in the memory device 150, according to an ordering method of the memory dies included in the memory device 150. In an embodiment, the scheduling order for the commands may be predetermined according to one or more priorities of the memory dies 610 to 695 and the commands to be provided to the respective memory dies 610 to 695, or a reception order of the requests provided from the host 102. The controller 130 may transmit the scheduled commands to the memory device 150 through an interface between the controller 130 and the memory device 150, for example, the physical layer (PHY) unit 560.

After the PHY unit 560 transmits the scheduled commands to the memory device 150, the RS scheduler 530 may generate RS commands for checking the operation status of the respective memory dies 610 to 695. In response to the RS commands, the memory device 150 may provide the operation status of the respective memory dies 610 to 695, some of which complete their command operations and some of which are currently performing their command operations in response to the provided commands for the respective memory dies 610 to 695. The RS scheduler 530 may schedule the generated RS commands according to a scheduling order of the RS commands. The PHY unit 560 may transmit the scheduled RS commands to the memory device 150.

The RS scheduler 530 may include a register 532 and an RS scheduling unit 534. The register 532 may store scheduling information for scheduling RS commands on the memory device 150. The RS scheduling unit 534 may generate and schedule the RS commands using the scheduling information stored in the register 532. The register 532 of the RS scheduler 530 may include a plurality of registers corresponding to the respective memory dies 610 to 695 included in the memory device 150, and the registers corresponding to the respective memory dies of the memory device 150 may store the scheduling information of the corresponding memory dies.

The scheduling information stored in the respective registers of the register unit 532 (i.e., the scheduling information for the respective memory dies 610 to 695) may include information about an ordering scheme of the RS commands for a corresponding memory die, a reception order of the requests provided from the host 102 for a corresponding memory die, operation times required for the completion of the command operations of a corresponding memory die, and issue periods at which the RS commands are to be provided to a corresponding memory die.

The ordering method included in the scheduling information may include information on whether the transmission of commands to the respective memory dies included in the memory device 150 or the performance of commands operations in the memory dies is based on a first ordering method (for example, an in-order method) or a second ordering method (for example, an out-of-order method), and information on the priority of the commands or the memory dies based on the first ordering method. For example, the ordering scheme of the RS commands may be one of an "in-order" scheme and an "out-of-order" scheme. According to the "in-order" scheme, the RS scheduling unit 534 may generate and schedule the RS commands according to the reception order of the requests provided from the host 102 for the corresponding memory die. According to the "in-order" scheme, the memory system may preferentially check the completion of the command operation according to the reception order of the requests provided from the host 102. When the completion of the command operation in the memory die having received earlier the request from the host 102 is checked, the memory system may issue another RS command for the memory die having received later the request from the host 102.

For example, when sequentially receiving commands for memory dies of the memory device 150, based on the in-order method, for example, read commands from the host 102, the memory system in accordance with an embodiment may transmit the read commands to the memory dies in the same order as the order in which the read commands were received from the host 102. Then, the memory system may sequentially provide read data of the memory dies in the same order in which the read commands were received from the host 102. Hereafter, the memory dies based on the in-order method may also be referred to as in-order memory dies. At this time, the memory system may provide the read data of the memory die having the highest priority among the in-order memory dies to the host 102, according to the priority of the in-order memory dies. The priority of the in-order memory dies may be determined by the FW unit 510, so that the command operations corresponding to the commands received from the host 102 are performed in the in-order memory dies according to the priority of the in-order memory dies. The FW unit 510 may determine the priority of completions of the command operations in the in-order memory dies, in response to the commands received from the host 102. Furthermore, the memory system may sequentially issue RS commands for the in-order memory dies, according to the order in which the read commands are received from the host 102. In particular, the memory system may preferentially issue an RS command for the in-order memory die having the highest priority among the in-order memory dies. In other words, the memory system may preferentially check the completion of the read operation in the in-order memory die having the highest priority. When the completion of the read operation in the in-order memory die having the highest priority is checked, the memory system may issue an RS command for the in-order memory die having the next priority.

According to the "out-of-order" scheme, the RS scheduling unit 534 may generate and schedule the RS commands depending on the operation times required for the completion of the command operations of the corresponding memory dies, and the issue periods at which the RS commands are to be provided to the corresponding memory dies, which are stored as the scheduling information in the respective registers of the register unit 532. The RS scheduling unit 534 may sequentially schedule and issue the RS commands according to the operation times and the issue periods for the corresponding memory die.

For example, when receiving sequentially commands for memory dies based on the out-of-order method among the memory dies of the memory device 150, for example, read commands from the host 102, the memory system in accordance with the present embodiment may transmit corresponding read commands to the memory dies based on the out-of-order method. Then, regardless of the order in which the read commands are received from the host 102, the memory system may sequentially provide read data of the memory dies based on the out-of-order method to the host 102. Hereinafter, the memory dies based on the out-of-order method may also be referred to as out-of-order memory dies. The memory system may issue RS commands for the out-of-order memory dies, regardless of the order in which the read commands are received from the host 102. At this time, the memory system may issue the RS commands for the out-of-order memory dies or check whether read operations are completed, in consideration of the performing times required until the command operations are completed in the respective memory dies of the memory device 150 and the period at which the RS commands are issued for the command operations of the respective memory dies of the memory device 150.

In accordance with an embodiment of the present invention, the RS scheduling unit 534 may schedule and issue the RS commands for the memory dies of the "in-order" scheme prior to the memory dies of the "out-of-order" scheme. That is, the memory system may preferentially check the completion of a command operation of the memory dies of the "in-order" scheme depending on the reception order of the requests from the host 102 by scheduling and issuing the RS commands according to the reception order of the requests from the host 102 for the memory dies of the "in-order" scheme. Then, the memory system may check the completion of a command operation of the memory dies of the "out-of-order" scheme depending on the operation times and the issue periods for the memory dies of the "out-of-order" scheme by scheduling and issuing the RS commands according to the operation times and the issue periods for the corresponding memory dies of the "out-of-order" scheme after the completion of the command operation in the memory dies of the "in-order" scheme are checked.

For example, when sequentially receiving commands for the in-order and out-of-order memory dies, for example, read commands from the host 102 in a state where the in-order memory dies and the out-of-order memory dies are included in the memory dies of the memory device 150, the memory system, in accordance with an embodiment, may preferentially perform command operations on the in-order memory dies, and issue RS commands. Then, the memory system may perform command operations on the out-of-order memory dies, and issue RS commands. In other words, after transmitting the read commands received from the host 102 to the in-order and out-of-order memory dies, the memory system may sequentially provide read data of the in-order memory dies to the host 102, according to the order in which the read commands are received from the 102 and the priority of the read commands. At this time, the memory system may sequentially issue the RS commands for the in-order memory dies. Then, the memory system may provide the read data of the out-of-order memory dies to the host 102, regardless of the order in which the read commands are received from the host 102. At this time, regardless of the order in which the read commands are received from the host 102, the memory system may issue the RS commands for the out-of-order memory dies, in consideration of the scheduling information such as the times required until the command operations are completed in the out-of-order memory dies (that is, performing times) and the period at which the RS commands are issued. The configuration in which the memory system in accordance with the present embodiment issues the RS commands for the plurality of memory dies included in the memory device 150 will be described in more detail with reference to FIG. 7.

The operation time, which is stored as the scheduling information in the respective registers of the register unit 532, required for the completion of the command operation of the corresponding memory die of the "out-of-order" scheme may comprise an initial waiting time and an offset. The initial waiting time of a current stage may be determined according to a total waiting time spent in a previous stage. In a single stage, the RS scheduler 530 may start to sequentially issue the scheduled RS commands after the initial waiting time when the command operation is not completed within the initial waiting time, and then check the completion of the command operation of the corresponding memory die, which may be done within the offset or after elapse of the offset. The single stage may correspond to a single command. The total waiting time may be time duration of the single stage, which may vary depending on the respective single stages of the respective memory dies 610 to 695. For example, the initial waiting time of a current stage may be set to the total waiting time of a previous stage. The offset may be set to a predetermined ratio of the initial waiting time, for example, not more than 10%. For example, when the initial waiting time is set as 500 μs, the offset may be set as 50 μs.

The issue period, which is stored as the scheduling information in the respective registers of the register unit 532, may be one of a constant period, an increasing period and a decreasing period.

When the command operation is not completed within the initial waiting time, the RS scheduler 530 may sequentially issue the RS commands with the increasing period within the offset and even after the elapse of the offset. The increasing period may be gradually increasing by an amount of an integer multiple of a reference clock T increasing as an issue number of the RS commands increases. For example, a second RS command may be issued with the increasing period having a value of three times of the reference clock (i.e., the increasing period having a value of 3 T) after the issue of a first RS command, and third to fifth RS commands may be issued with the increasing periods respectively having values of four to six times of the reference clock T (i.e., the increasing periods respectively having values of 4 T to 6 T) respectively after the issues of the respectively previous RS commands.

While sequentially issuing the RS commands, when a current issue period of the RS command to be currently issued exceeds a predetermined maximum issue period in a single stage or when an accumulative time length of total issue periods so far including the issue period of the RS command to be currently issued in a single stage exceeds a predetermined maximum accumulative time length, the RS scheduler 530 may sequentially issue the RS commands with the decreasing period. The decreasing period may be gradually decreasing by an amount of an integer multiple of the reference clock T decreasing as an issue number of the RS commands increases. For example, when the predetermined maximum issue period in a single stage is seven times of the reference clock T (i.e., 7 T) and the issue period of a sixth RS command to be currently issued exceeds the 7 T, the sixth and subsequent RS commands may be issued with the decreasing periods respectively having values of six and less times of the reference clock T (e.g., the decreasing periods respectively having values of 6 T to 3 T) respectively after the issues of the respectively previous RS commands. In similar way, when the predetermined maximum accumulative time length in a single stage is 16 T and the accumulative time length of total issue periods so far including the issue period (e.g. 6 T) of the sixth RS command to be currently issued in a single stage exceeds the 16 T, the sixth and subsequent RS commands may be issued with the decreasing periods respectively having values of fifth and less times of the reference clock T (e.g., the decreasing periods respectively having values of 5 T to 3 T) respectively after the issues of the respectively previous RS commands.

In accordance with various exemplary embodiments of the present invention, the constant period may be substituted for the decreasing period.

The controller 130 may further include an aging controller 540. The aging controller 540 may independently schedule and issue an RS command to a memory die having the greatest operation time among the memory dies 610 to 695 despite the "in-order" scheme or the "out-of-order" scheme. The memory dies having the greatest operation time among the memory dies 610 to 695 may run a risk of receiving the RS commands with too long interval. Therefore, the aging controller 540 may issue the RS command to a memory die having the greatest operation time whenever a predetermined number (e.g., 10) of the RS commands are issued to the memory dies 610 to 695 other than the memory die having the greatest operation time or whenever accumulative time length of total issue periods of the RS commands issued so far to the memory dies 610 to 695 other than the memory die having the greatest operation time reaches a predetermined threshold (e.g., 38 T).

The controller 130 may control the issue of the RS commands to the plurality of memory dies included in the memory device 150 through the aging controller 540, in consideration of the total waiting time which is determined according to the offset, or particularly the performance times of the command operations in the respective memory dies and the period at which the RS commands are issued. For example, as the issue period of the RS commands is increased, the RS commands may not be issued or transmitted to a second memory die in which the total waiting time, i.e. the performing time of the command operations is the maximum value, among the plurality of memory dies. Thus, the aging controller 540 may count the RS commands transmitted to the memory dies of the memory device 150. Then, when a preset number of RS commands are transmitted to the memory dies or the RS commands are transmitted to the memory dies at a preset issue period, the aging controller 540 may control the RS commands to be transmitted to the memory die.

That is, the controller 130 may transmit the RS commands scheduled through the RS scheduler 530 to the plurality of memory dies included in the memory device 150, or issue the RS commands to the memory dies. At this time, the controller 130 may count the RS commands issued to the memory dies of the memory device 150, for example, the RS commands issued to the other memory dies excluding the second memory die among the memory dies of the memory device 150, and then issue RS commands to the second memory die when the counted number of RS commands issued to the other memory dies is equal to a preset number, for example, the maximum counted number or the entire counting issue period of the issued RS commands is the maximum entire counting issue period. For example, one RS command may be issued to the second memory die, whenever the counted number of RS commands issued to the other memory dies is the maximum counting number of 10 or the entire counting issue period of the issued RS commands is the maximum entire counting issue period corresponding to 38 times of the reference clock T. The configuration in which the memory system in accordance with the present embodiment issues RS commands for the plurality of memory dies included in the memory device 150 will be described in more detail with reference to FIG. 7.

The memory device 150 may include a plurality of memory dies, for example, N memory dies 610, 630 and 695, and the memory dies 610, 630 and 695 may perform command operations corresponding to commands received from the controller 130. While performing the command operations, the memory dies 610, 630 and 695 may transmit responses to the RS commands received from the controller 130, that is, the issued RS commands to the controller 130, such that the controller 130 can recognize whether the command operations are completed in the respective memory dies 610, 630 and 695.

Figure 6:
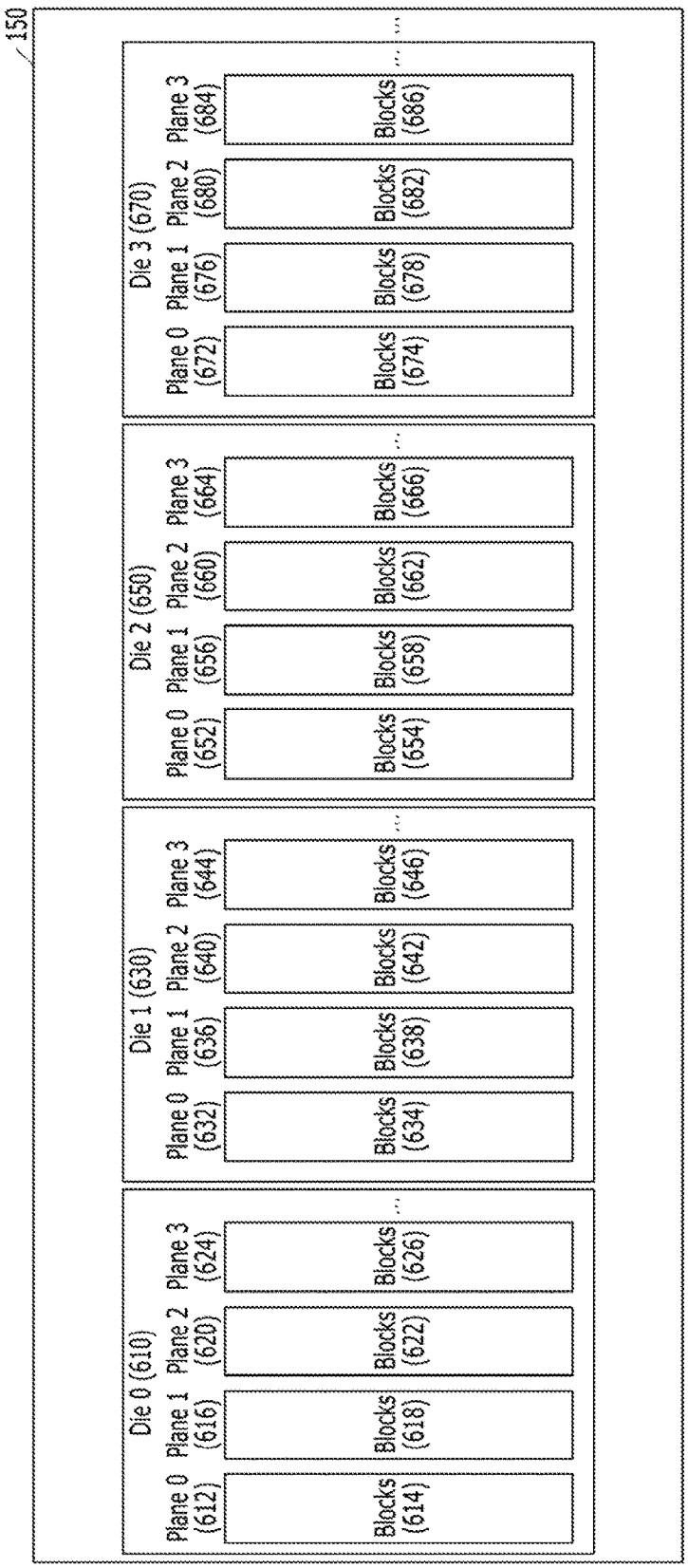
FIG. 6 is a schematic diagram illustrating an exemplary configuration of a memory device employed in the memory system of FIG. 5.

FIG. 6 is a schematic diagram illustrating an example of the memory device 150 of FIG. 5.

Referring to FIG. 6 as an example, the memory device 150 may include a plurality of memory dies, for example, a memory die 0(610), a memory die 1(630), a memory die 2(650) and a memory die 3(670), and each of the memory dies 610, 630, 650 and 670 may include a plurality of planes. For example, the memory die 0(610) may include a plane 0(612), a plane 1(616), a plane 2(620) and a plane 3(624), the memory die 1(630) may include a plane 0(632), a plane 1(636), a plane 2(640) and a plane 3(644), the memory die 2(650) may include a plane 0(652), a plane 1(656), a plane 2(660) and a plane 3(664), and the memory die 3(670) may include a plane 0(672), a plane 1(676), a plane 2(680) and a plane 3(684). Furthermore, the planes 612, 616, 620, 624, 632, 636, 640, 644, 652, 656, 660, 664, 672, 676, 680 and 684 in the memory dies 610, 630, 650 and 670 included in the memory device 150 may include a plurality of memory blocks 614, 618, 622, 626, 634, 638, 642, 646, 654, 658, 662, 666, 674, 678, 682 and 686.

Figure 7:
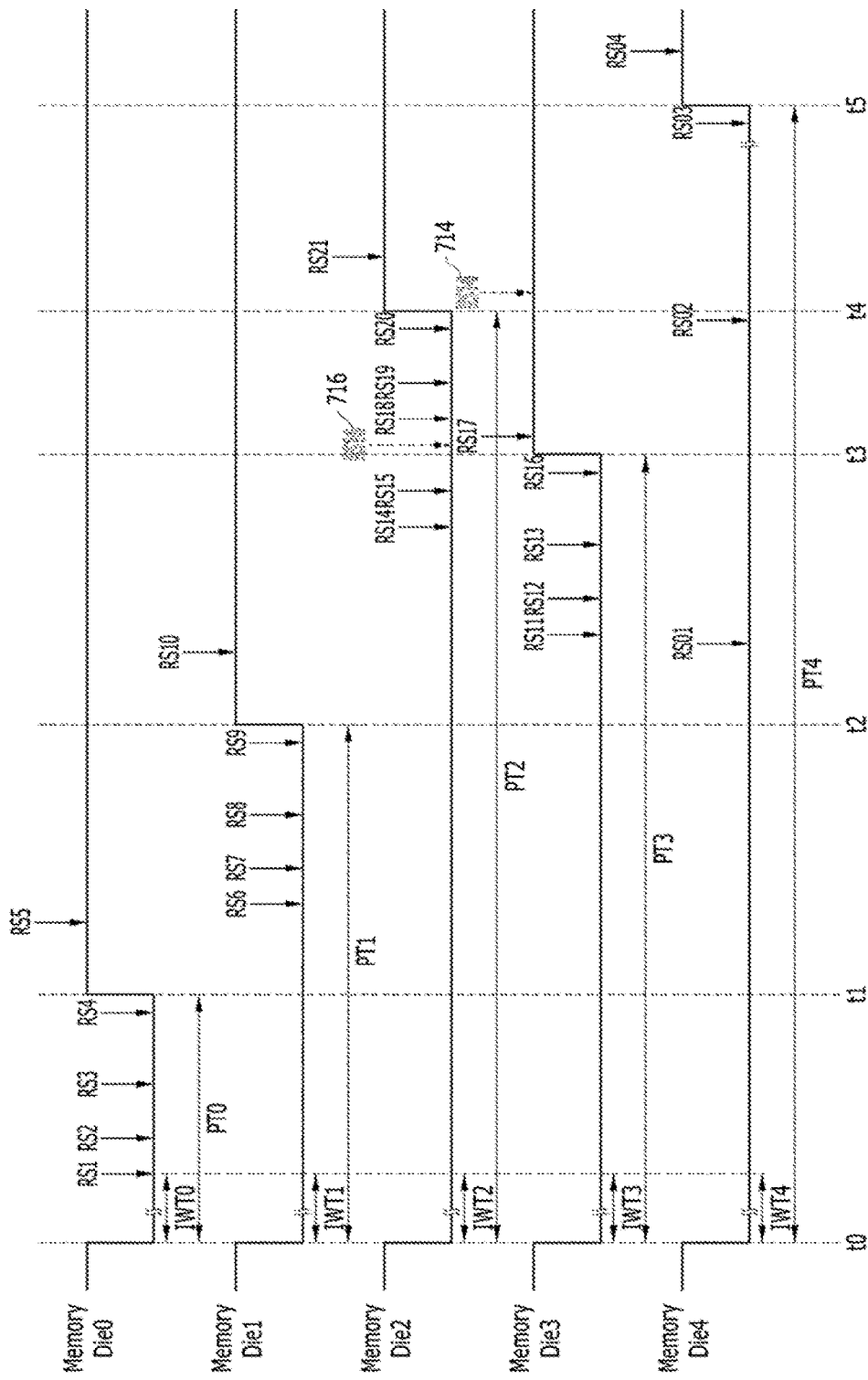
FIG. 7 is a timing diagram illustrating an operation of a controller in the memory system of FIG. 5.

FIG. 7 is a timing diagram illustrating an operation of a controller in the memory system of FIG. 5.

It is assumed that the memory device 150 includes five memory dies 0 to 4 sharing a single command channel, memory dies 0 and 1 are of the "in-order" scheme, and memory dies 2, 3, 4 are of the "out-of-order" scheme. Between the first and second memory dies 0 and 1 of the "In-order" scheme, the first memory die 0 may have a higher priority than the second memory die 1 according to the reception order of the requests provided from the host 102.

Referring to FIG. 7, when commands, for example, read commands are received from the host 102, the controller 130 may transmit the read commands to the memory dies 0 to 4 such that command operations corresponding to the read commands are performed in the memory dies 0 to 4.

After transmitting the read commands to the memory dies 0 to 4, the controller 130 may sequentially provide data read from the in-order memory dies 0 and 1 to the host 102 from a time point t0 in the same order as the order in which the read commands are received from the host 102. At this time, the controller 130 may sequentially issue RS commands to the memory dies 0 and 1.

Then, the controller 130 may provide data read from the out-of-order memory dies 2, 3, 4 to the host 102 regardless of the reception order of the requests provided from the host 102. At this time, regardless of the reception order of the requests provided from the host 102, the controller 130 may issue RS commands to the memory dies 2, 3 and 4 according to the scheduling information including the operation times required for the completion of the command operations of the corresponding memory die, and the issue periods at which the RS commands are to be provided to the corresponding memory die.

That is, after transmitting the read commands to the memory dies 0 to 4, the controller 130 may check the operation statuses of the memory dies 0 to 4 which perform command operations corresponding to the read commands received from the host 102 at the time point t0. In other words, the controller 130 may check whether the command operations are completed in the memory dies 0 to 4.

More specifically, the controller 130 may preferentially check the operation statuses of the in-order memory dies 0 and 1 among the memory dies 0 to 4 which perform command operations corresponding to the read commands received from the host 102, from the time point t0 according to the order of the read commands received from the host 102. In particular, the controller 130 may first check the operation status of the memory die 0 and then check the operation status of the memory die 1 i.e., may check the operation status of the "in-order" dies 0 and 1 in the same order as the order in which they were received. As exemplified in FIG. 7, when the command operation of the memory die 0 is not completed during the initial waiting time IWT0 of the memory die 0 from the time point t0 after the read command is transmitted to the memory die 0, the controller 130 may issue an RS command by transmitting RS1 command to the memory die 0 based on the reference clock T of the memory system after the initial waiting time IWT0. Furthermore, when a response to the RS command RS1 indicates that the command operation of the memory die 0 is not completed, the controller 130 may issue RS commands RS2 to RS5 to the memory die 0 at periods which are increased to integer multiples of the reference clock T. The RS command RS2 may be issued at a first period having a value of 3 T after the issue of the RS command RS1, the RS command RS3 may be issued at a second period having a value of 4 T after the issue of the RS command RS2, the RS command RS4 may be issued at a third period having a value of 5 T after the issue of the RS command RS3, and the RS command RS5 may be issued at a fourth period having a value of 6 T after the issue of the RS command RS4.

As exemplified in FIG. 7, the controller 130 may recognize the completion of the command operation in the memory die 0 through the response to the RS command RS5 which is transmitted after the operation time PT0 of the memory die 0. The operation time PT0 of the memory die 0 may include the initial waiting time IWT0 and a corresponding offset.

When the controller 130 recognizes the completion of the command operation in the memory die 0 through the response to the RS command RS5, a time period from the initial waiting time IWT0 of the memory die 0 to the performing time PT0 of the memory die 0, that is, the time point t1 may be set to the offset section of the memory die 0. Furthermore, a time period from the time point t0 to the time point t1 may be set to the performing time PT0, and a time period from the time point t0 to the point of time that the response to the RS command RS5 is received may be a total waiting time for the command operation of the memory die 0.

The controller 130 may update the initial waiting time IWT0 of the memory die 0 to be the same as the total waiting time of the memory die 0. When a subsequent read command is provided to the memory die 0, the controller 130 may determine the operation time PT0 of the memory die 0 according to the updated initial waiting time IWT0, which is the same as the total waiting time of the previous stage of the memory die 0, and the offset corresponding to the updated initial waiting time IWT0 of the memory die 0, and schedule and issue the RS commands for the memory die 0 according to the updated initial waiting time IWT0 and the operation time PT0 of the memory die 0. Then, as the command operation of the memory die 0 is completed, the controller 130 may provide data read from the memory die 0 to the host 120.

As exemplified in FIG. 7, after completion of the command operation of the memory die 0, when a command operation of the memory die 1 is not completed even after the initial waiting time IWT1 of the memory die 1 from the time point t0, the memory controller 130 may issue RS commands RS6 to RS10 to the memory die 1 in similar way as described above with reference to the memory die 0.

The RS command RS6 may be issued at a fifth period having a value of 2 T after the issue of the RS command RS5 to the memory die 0. Thus, after the RS command RS6 is issued at the fifth period having a value of 2 T following the issue of the RS command RS5, the RS command RS7 may be issued at the first period having a value of 3 T after the issue of the RS command RS6, the RS command RS8 may be issued at the second period having a value of 4 T after the issue of the RS command RS7, the RS command RS9 may be issued at the third period having a value of 5 T after the issue of the RS command RS8, and the RS command may be issued at the fourth period having a value of 6 T after the RS command RS9.

As exemplified in FIG. 7, the controller 130 may recognize the completion of the command operation in the memory die 1 through the response to the RS command RS10 which is transmitted after the operation time PT1 of the memory die 1. The operation time PT1 of the memory die 1 may include the initial waiting time IWT1 and the corresponding offset.

In similar way to the case of the memory die 0, the controller 130 may update the initial waiting time IWT1 of the memory die 1 to be the same as the total waiting time of the memory die 1. When a subsequent read command is provided to the memory die 1, the controller 130 may determine the operation time PT1 of the memory die 1 according to the updated initial waiting time IWT1, which is the same as the total waiting time of the previous stage of the memory die 1, and the offset corresponding to the updated initial waiting time IWT1, and schedule and issue the RS commands for the memory die 1 according to the updated initial waiting time IWT1 and the operation time PT1 of the memory die 1.

As exemplified in FIG. 7, after checking the completion of the command operations in the in-order memory dies 0 and 1 through the responses to the RS commands RS5 and RS10, the controller 130 may check the completion of the command operations in the out-of-order memory dies 2 to 4. The controller 130 may issue RS commands to the out-of-order memory dies 2 to 4 regardless of the reception order of the requests provided from the host 102.

More specifically, when the command operations of the memory dies 2 to 4 are not completed during respective initial waiting times IWT2, IWT3 and IWT4, the controller 130 may issue the RS commands to the memory dies 2 to 4 according to the operation times of the command operations and the issue period of the RS commands for the memory dies 2 to 4 of the "out-of-order" scheme.

Since the operation time PT4 of the memory die 4 is greatest among the memory dies 2 to 4, the aging controller 540 of the controller 130 may issue the RS command to the memory die 4 whenever a predetermined number (e.g., 10) of the RS commands are issued to the memory dies 0 to 3 other than the memory die 4 or whenever a cumulative time length of total issue periods of the RS commands issued so far to the memory dies 0 to 3 other than the memory die 4 reaches a predetermined threshold (e.g., 38 T).

As exemplified in FIG. 7, the RS command RS01 for the memory die 4 may be issued at a sixth period having a value of 1 T after the issue of the RS command RS10 to the memory die 1, and a subsequent RS command RS02 for the memory 4 may be issued at the sixth period having a value of 1 T after the issue of the RS command RS20 to the memory die 2.

When the command operation of the memory die 4 is not yet completed even after checking the completion of the command operations in the memory dies 2 and 3, the controller 130 may issue RS commands RS03 and RS04 in the same way of the case of the memory die 0 or 1 in terms of the issue period and update of the initial waiting time IWT4, the corresponding offset and the operation time PT4 of the memory die 4.

As for the other memory dies 2 and 3 of the "out-of-order" scheme other than the memory die 4 having the greatest operation time, after checking the completion of the command operations in the in-order memory dies 0 and 1 through the responses to the RS commands RS5 and RS10, the controller 130 may issue the RS commands to the memory dies 2 and 3 according to the respective operation times thereof. For example, the controller 130 may issue first the RS commands to the memory die 3 which has a lesser operation time PT3 than the operation time PT2 of memory die 2.

More specifically, the controller 130 may issue RS commands RS11 to RS13 to the memory die 3 in similar way to the case of the memory die 1.

When the RS command RS14 is to be issued after the issue of the RS13 command to the memory die 3, if the RS command RS14 is issued to the memory die 3 (refer to reference number 714 in FIG. 7), the third period having a value of 5 T at which the RS14 command is issued to the memory die 3 after the issue of the RS command RS13 will exceed the operation time PT2 of the memory die 2. In this case, the memory die 2 may run a risk of not receiving any RS command in current stage even after checking the completion of the command operation of the memory die 3 since the operation time PT2 has elapsed when the completion of the command operation of the memory die 3 is checked. Therefore, in order to secure the completion check of the command operation of the memory die 2, the controller 130 may change the memory die to which the RS commands are issued. That is, the controller 130 may issue the RS command RS14 and subsequent RS command RS15 to the memory die 2 rather than the memory die 3 in similar way to the case of the memory die 1 after the issue of the RS command RS13 to the memory die 3.

Similarly, when the RS command RS16 is to be issued after the issue of the RS15 command to the memory die 2, if the RS command RS16 is issued to the memory die 2 (refer to reference number 716 in FIG. 7), the second period having a value of 4 T at which the RS16 command is issued to the memory die 2 after the issue of the RS command RS15 will exceed the operation time PT3 of the memory die 3. In this case, the memory die 3 may also run a risk of not receiving subsequent RS command in current stage even after checking the completion of the command operation of the memory die 2 since the operation time PT3 has elapsed when the completion of the command operation of the memory die 2 is checked. Therefore, in order to secure the completion check of the command operation of the memory die 3, the controller 130 may change the memory die to which the RS commands are issued. That is, the controller 130 may issue the RS command RS16 and subsequent RS command RS17 to the memory die 3 rather than the memory die 2 in similar way to the case of the memory die 1 after the issue of the RS command RS15 to the memory die 2.

As exemplified in FIG. 7, the controller 130 may recognize the completion of the command operation in the memory die 3 through the response to the RS command RS17 which is transmitted after the operation time PT3 of the memory die 3. Then the controller 130 may issue the RS commands RS18 to RS21 in similar way to the case of the memory die 1 to recognize the completion of the command operation in the memory die 2 through the response to the RS command RS21 which is transmitted after the operation time PT2 of the memory die 2.

In similar way to the case of the memory die 0, the controller 130 may update the initial waiting times IWT2 and IWT3 of the memory dies 2 and 3 to be the same as the total waiting time of the memory dies 2 and 3, respectively. When a subsequent read command is provided to the respective memory dies 2 and 3, the controller 130 may determine the respective operation times PT2 and PT3 of the respective memory dies 2 and 3 according to the respectively updated initial waiting times IWT2 and IWT3, which are the same as the respective total waiting times of the previous stages of the respective memory dies 2 and 3, and the respective offsets corresponding to the respectively updated initial waiting times IWT2 and IWT3, and schedule and issue the RS commands for the respective memory dies 2 and 3 according to the respectively updated initial waiting times IWT2 and IWT3 and the respective operation times PT2 and PT3 of the respective memory dies 2 and 3.

At this time after the completion check of the command operation of the memory die 3, subsequent RS commands may be alternately issued to the memory dies 2 and 4 in similar way to the case of the memory dies 2 and 3. FIG. 7 exemplifies that the periods at which the RS commands are issued to the memory die 2 do not exceed the operation time PT4 of the memory die 4.

The memory system in accordance with the present embodiment may check the completion of the command operations in the memory dies 0 and 1 of the "in-order" scheme among the memory dies 0 to 4 included in the memory device 150 according to the order in which the commands are received, and provide data corresponding to the command operations of the memory dies 0 and 1, for example, read data to the host 102. Then, regardless of the reception order of the requests provided from the host 102, the memory system may check the completion of the command operations in the memory dies 2 to 4 of the "out-of-order" scheme, and provide data corresponding to the command operations of the memory dies 2 to 4, for example, read data to the host 102.

Figure 8:
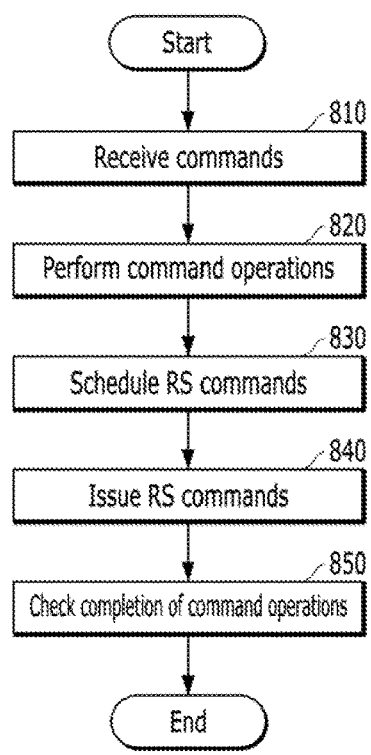
FIG. 8 is a flowchart illustrating an operation of the controller in the memory system of FIG. 5 in accordance with an embodiment of the present invention.

FIG. 8 is a flowchart illustrating the operation of the controller 130.

Referring to FIG. 8, the memory system may receive commands from the host 102 for the memory device 150 including a plurality of memory dies at step 810, and perform command operations corresponding to the commands on the memory dies of the memory device 150 at step 820.

At step 830, the memory system may check the operation statuses of the memory dies which perform the command operations, and schedule RS commands for the respective memory dies which are performing the command operations, in order to check whether the command operations are completed.

At step 840, the memory system may transmit and issue the scheduled RS commands to memory dies of which the command operations are not completed, among the memory dies which are performing the command operations.

At step 850, the memory system may check whether the command operations of the memory dies are completed, through responses to the RS commands issued to the respective memory dies, and provide to the host 102 data of the command operations corresponding to the commands, for example, data read from the memory dies corresponding to read commands.

Since the operation of scheduling the RS commands for the plurality of memory dies included in the memory device of the memory system, the operation of issuing the scheduled RS commands to the respective memory dies, and the operation of checking whether the commands operations are completed in the respective memory dies through the responses to the issued RS commands have been described in more detail with reference to FIGS. 5 to 7 or particularly FIG. 7, the detailed descriptions thereof are omitted herein.

FIGS. 9 to 17 are diagrams schematically illustrating application examples of the data processing system of FIG. 1.

Figure 9:
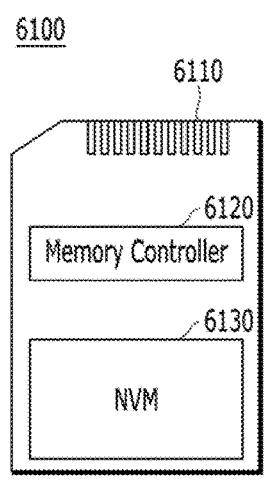
FIGS. 9 to 17 are diagrams schematically illustrating application examples of the data processing system of FIG. 1 in accordance with various embodiments of the present invention.

FIG. 9 is a diagram schematically illustrating another example of the data processing system including the memory system in accordance with the present embodiment. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 and 5, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
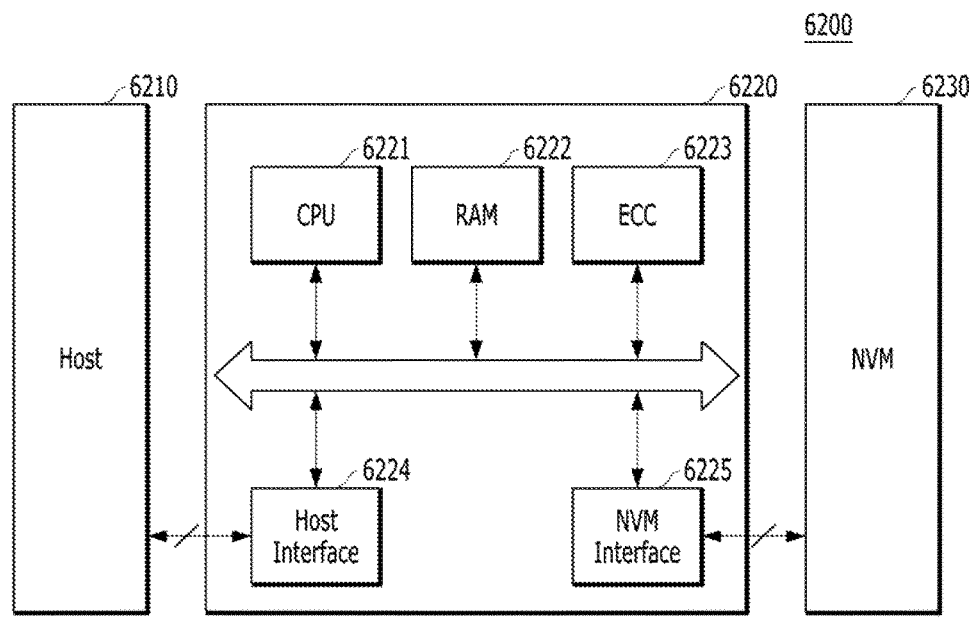

FIG. 10 is a diagram schematically illustrating another example of the data processing system including the memory system in accordance with the present embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5, and the memory controller 6220 may correspond to the controller 130 in the memory system 110 illustrated in FIGS. 1 and 5.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WIFI or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
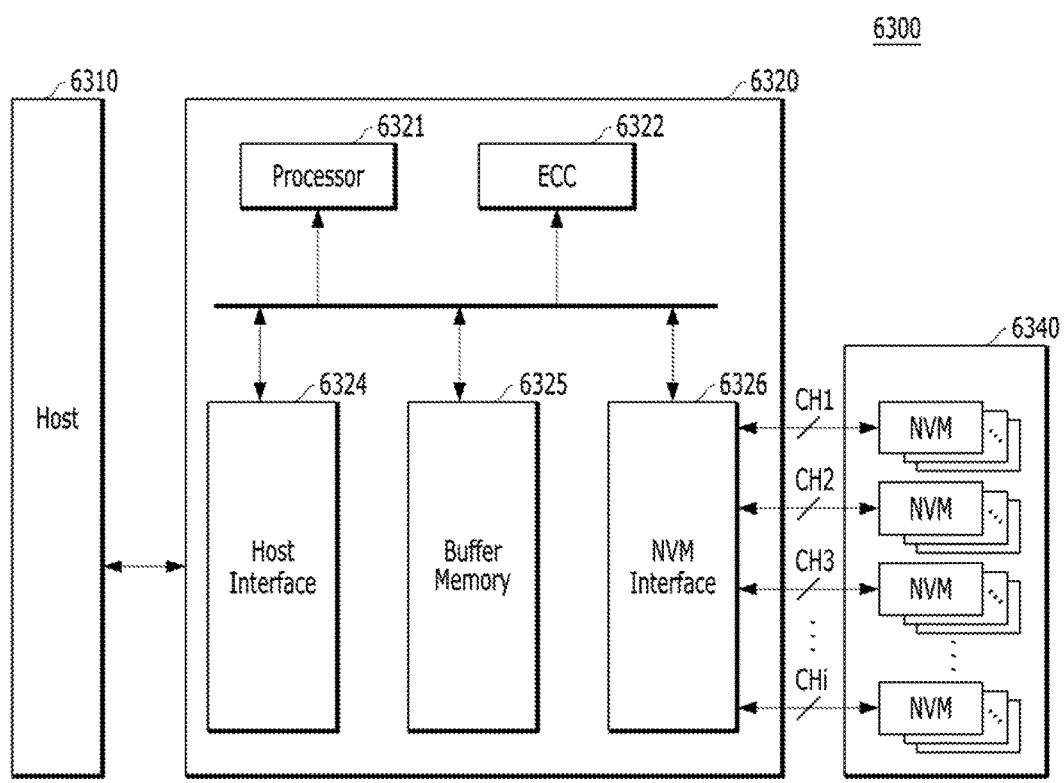

FIG. 11 is a diagram schematically illustrating another example of the data processing system including the memory system in accordance with the present embodiment. FIG. 11 schematically illustrates an SSD to which the memory system in accordance with the present embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIGS. 1 and 5, and the memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
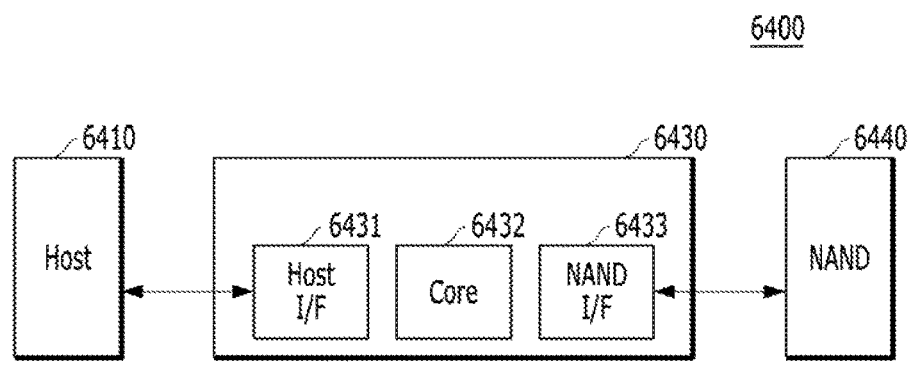

FIG. 12 is a diagram schematically illustrating another example of the data processing system including the memory system in accordance with the present embodiment. FIG. 12 schematically illustrates an embedded Multi-Media Card (eMMC) to which the memory system in accordance with the present embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIGS. 1 and 5, and the memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with the present embodiment. FIGS. 13 to 16 schematically illustrate UFS (Universal Flash Storage) systems to which the memory system in accordance with the present embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
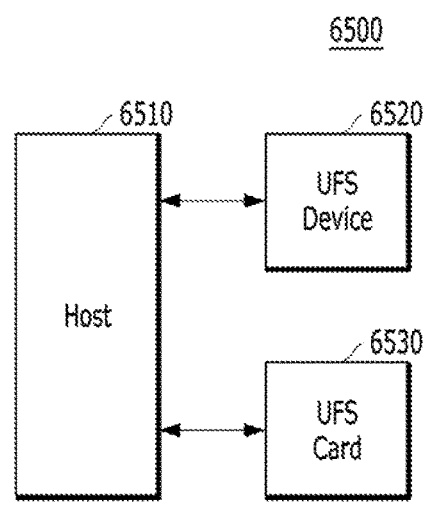

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
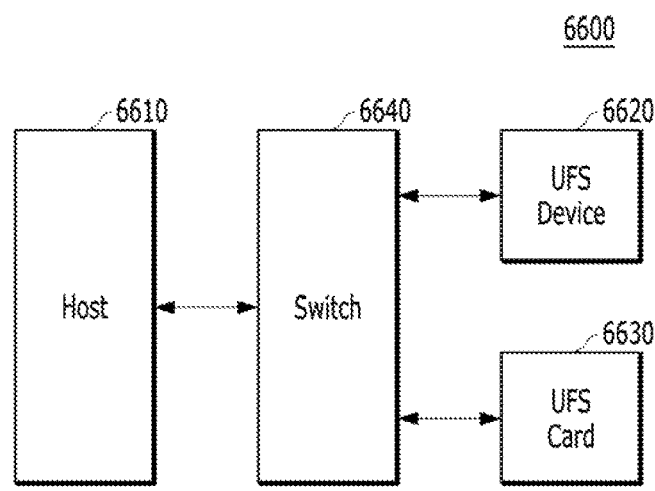

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
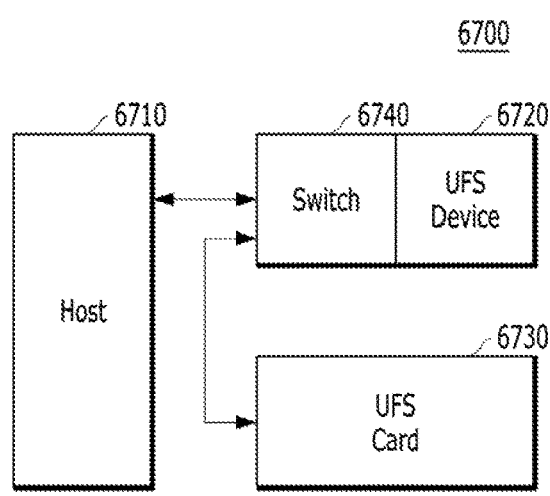

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
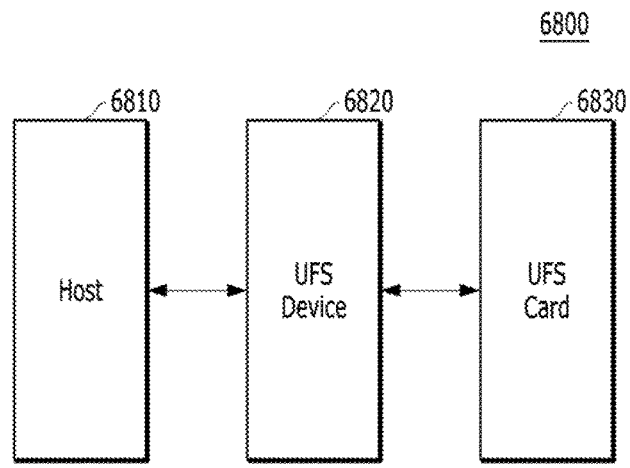

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
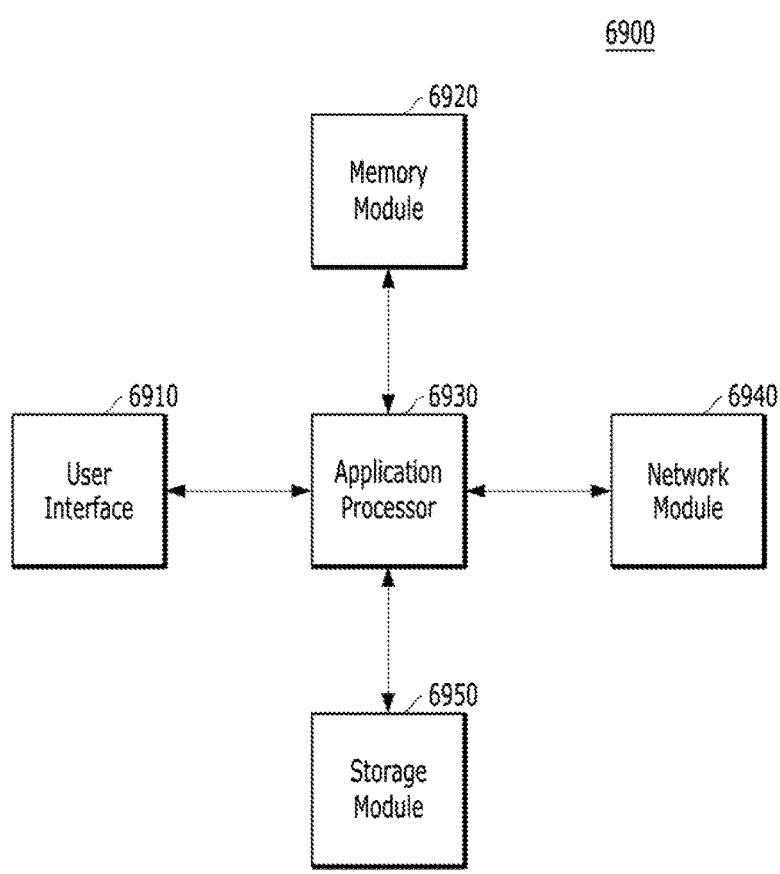

FIG. 17 is a diagram schematically illustrating another example of the data processing system including the memory system in accordance with an embodiment. FIG. 17 is a diagram schematically illustrating a user system to which the memory system in accordance with the present embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In accordance with various embodiments of the present invention, a memory system and an operating method thereof are provided that can minimize the complexity and performance reduction, maximize the use efficiency of a memory device, and rapidly and stably processing data to the memory device.

Although various embodiments have been described for illustrative purposes, it will be apparent to those skilled in the art that various other embodiments, changes and modifications thereof may be made without departing from the spirit and scope of the invention as defined in the following claims.

What is claimed is:

1. A memory system comprising:
a memory device comprising a plurality of memory dies, each memory die being suitable for performing one or more corresponding command operations in response to a plurality of corresponding commands entered from a host operatively coupled to the memory system; and
a controller suitable for sequentially issuing first read status (RS) commands to each of the memory dies included in a first memory die group defined among the memory dies according to a reception order of read commands entered from the host, issuing second RS commands to each of the memory dies included in a second memory die group defined among the memory dies according to scheduling information regardless of the reception order, checking whether the command operations are completed in the memory dies of the first and second memory die groups through responses to the RS commands, and respectively resetting issue periods of the RS commands according to the completion of the command operations of the memory dies of the first and second memory die groups.

2. The memory system of claim 1,
wherein the controller issues the first and second RS commands to the memory dies of the first and second memory die groups at first and second periods, and
wherein the scheduling information includes operation times of the command operations in the memory dies included in the second memory die group and the issue periods.

3. The memory system of claim 2,
wherein the controller issues the first RS commands for a first memory die having a high priority among the memory dies included in the first memory die group, and
wherein the controller issues the first RS commands for a second memory die having a low priority among the memory dies included in the first memory die group after checking completion of the command operation of the first memory die.

4. The memory system of claim 2, wherein the controller issues the second RS commands to the memory dies included in the second memory die group according to the operation times of the command operations and the issue periods.

5. The memory system of claim 4, wherein the controller issues third RS commands for a first memory die having a first operation time and fourth RS commands for a second memory die having a second operation time, among the memory dies included in the second memory die group.

6. The memory system of claim 5,
wherein the controller compares a first issue period of the third RS commands with the second operation time, and compares a second issue period of the fourth RS commands with the first operation time, and
wherein the controller resets the first and second issue periods, and then issues the third and fourth RS commands according to a result of the comparison.

7. The memory system of claim 6,
wherein the controller issues the fourth RS commands when the first issue period exceeds the second operation time, and
wherein the controller issues the third RS commands when the second issue period exceeds the first operation time.

8. The memory system of claim 4, wherein the controller issues fifth RS commands for a third memory die having a greatest operation time among the memory dies included in the second memory die group whenever a predetermined number of the fifth RS commands are issued to the memory dies other than the third memory die.

9. The memory system of claim 2, wherein the controller issues the second RS commands at third and fourth periods when a current issue period of the RS command to be currently issued exceeds a predetermined maximum issue period or when an accumulative time length of total issue periods so far including the issue period of the RS command to be currently issued exceeds a predetermined maximum accumulative time length.

10. The memory system of claim 9,
wherein the first to fourth periods are determined according to a reference clock of the memory system,
wherein the first and second periods have periods that are increased by an amount of integer multiples of the reference clock, and
wherein the third and fourth periods have periods that are maintained to or decreased by an amount of integer multiples of the reference clock.

11. The memory system of claim 8,
wherein the controller comprises:
a scheduler suitable for determining when the first to fifth RS commands are delivered into the respective memory dies; and
an aging controller, engaged with the scheduler, suitable for controlling the issue of the fifth RS commands to the third memory die, and
wherein the scheduler comprises:
a register suitable for storing the reception order of the commands, the issue periods and the operation time; and
a scheduling unit suitable for issuing the first to fifth RS commands to the respective memory dies according to the reception order of the commands, the issue periods and the operation times.

12. An operating method of a memory system comprising a memory device having a plurality of memory dies, the operating method comprising:
receiving a plurality of commands from a host for the memory dies, respectively;
performing, by the respective memory dies, command operations in response to the commands;

sequentially issuing first read status (RS) commands to each of the memory dies included in a first memory die group according to a reception order of read commands entered from the host;

issuing second RS commands to each of the memory dies included in a second memory die group according to scheduling information regardless of the reception order;

checking whether the command operations are completed in the memory dies through responses to the RS commands; and respectively resetting issue periods of the RS commands according to the completion of the command operations of the memory dies.

13. The operating method of claim 12, wherein the issuing of the RS commands comprises:

issuing the first RS commands to the memory dies included in the first memory die group according to the reception order at first and second periods; and issuing the second RS commands to the memory dies included in the second memory die group according to the scheduling information including operation times of the command operations in the memory dies included in the second memory die group and the issue periods at the first and second periods.

14. The operating method of claim 13, wherein the issuing of the first RS commands comprises:

issuing the first RS commands for a first memory die having a high priority among the memory dies included in the first memory die group;

checking whether the command operation of the first memory die is completed; and issuing the first RS commands for a second memory die having a low priority among the memory dies included in the first memory die group after checking the completion of the command operation of the first memory die.

15. The operating method of claim 13, wherein the issuing of the second RS commands comprises issuing third RS commands for a first memory die having a first operation time and fourth RS commands for a second memory die having a second operation time, among the memory dies included in the second memory die group.

16. The operating method of claim 15, wherein the issuing of the second RS commands further comprises:

comparing a first issue period of the third RS commands with the second operation time, and comparing a second issue period of the fourth RS commands with the first operation time; and resetting the first and second issue periods, and then issues the third and fourth RS commands according to a result of the comparing.

17. The operating method of claim 16, wherein the issuing of the second RS commands further comprises:

issuing the fourth RS commands when the first issue period exceeds the second operation time; and issuing the third RS commands when the second issue period exceeds the first operation time.

18. The operating method of claim 13, wherein the issuing of the second RS commands further comprises issuing fifth RS commands for a third memory die having a greatest operation time among the memory dies included in the second memory die group whenever a predetermined number of the fifth RS commands are issued to the memory dies other than the third memory die.

19. The operating method of claim 13, wherein the issuing of the second RS commands further comprises issuing the second RS commands at third and fourth periods when a current issue period of the RS command to be currently issued exceeds a predetermined maximum issue period or when an accumulative time length of total issue periods so far including the issue period of the RS command to be currently issued exceeds a predetermined maximum accumulative time length.

20. The operating method of claim 19, wherein the first to fourth periods are determined according to a reference clock of the memory system, wherein the first and second periods have periods that are increased by an amount of integer multiples of the reference clock, and wherein the third and fourth periods have periods that are maintained to or decreased by an amount of integer multiples of the reference clock.

* * * * *